United States Patent [19]
Guena et al.

[11] Patent Number: 4,956,645
[45] Date of Patent: Sep. 11, 1990

[54] RADIO SYSTEM FOR DATA TRANSMISSION WITH ONE PASSIVE END AND STATION INCLUDED IN SUCH A SYSTEM

[75] Inventors: Jean Guena, Trebeurden; Jean-Claude Leost, Perros-Guirec; Sylvain Meyer, Lannion, all of France

[73] Assignee: Etat Francais represente par le Ministre des Postes, Telecommunications et de l'Espace (Centre National d'Etudes des Telecommunications), Issy-Les-Moulineaux, France

[21] Appl. No.: 351,234

[22] Filed: May 15, 1989

[30] Foreign Application Priority Data

May 20, 1988 [FR] France .................. 88 06794

[51] Int. Cl.[5] ........................ H01Q 21/06; H01Q 21/24
[52] U.S. Cl. .................................................... 342/361
[58] Field of Search ................................ 342/361, 362

[56] References Cited

U.S. PATENT DOCUMENTS 4,831,384  5/1989  Sefton, Jr. ........................ 342/361

Primary Examiner—Theodore M. Blum
Attorney, Agent, or Firm—Lowe, Price, LeBlanc, Becker & Shur

[57] ABSTRACT

The radio system embodying the invention comprises a central station and a terminal stations or passive end. Data signals are transmitted between data processing units which are respectively connected to the central and terminal stations. The radio system is essentially characterized in that the terminal station comprises a square two-dimensional antenna and a microwave switcher so as to phase modulate, by means of a data signal, a microwave transmitted from the terminal station to the central station. This phase modulated microwave is produced from an incident microwave transmitted by the central station and issued to the terminal station by the square two-dimensional antenna. The design of the terminal station is very simple and compact and can be included, as well as the corresponding data processing unit, in a contact-free chip card.

11 Claims, 5 Drawing Sheets

RADIO SYSTEM FOR DATA TRANSMISSION WITH ONE PASSIVE END AND STATION INCLUDED IN SUCH A SYSTEM

BACKGROUND OF THE INVENTION

1. Field of the Invention

This invention relates to close-range radio communications in general. More specifically, this invention relates to a radio system for data transmission by microwaves between a central station and a passive end that does not have its own UHF source and that operates in a response mode.

Such a radio system can be used to exchange information over a short distance between a main point or central station and one or more passive ends or terminal stations which should be very simply designed to meet cost and space requirements. This type of radio system has numerous applications, e.g. in:

remote-controlled data gathering systems such as a remote-controlled domestic counter reading system with a mobile radio accessor, access or checking management systems with remote inquiry for code numbers memorized in individual access or checking cards, road or rail signalling systems, automatic sorting systems, e.g. for parcel post, automatic invoicing systems for contact-free chip cards.

2. Description of the Prior Art

There are several known radio systems with a passive end in the prior art. Usually, an amplitude modulation is used to transmit data in the transmission direction going from the passive end towards the central station. An incident microwave transmitted by the central station is received by the passive end which modulates in amplitude by the data to be transmitted the incident microwave received or one of its harmonics before retransmitting it towards the central station. The passive end is supplied by the incident microwave. A rectifying and filtering circuit is usually provided to produce a d.c. voltage power supply from the received incident microwave.

The modulated microwave retransmitted by the passive end towards the central station has a low output due to the low energy output rate at reception of the incident microwave and to the energy deducted to supply the passive end, and consequently the range of such a radio system is necessarily limited. Moreover, the amplitude modulation has low immunity from noise compared to a frequency or phase modulation, which does not favour the range of the system embodying the prior art.

A solution to improve the range of a radio system with a passive end will be e.g. to replace the amplitude modulation of the retransmitted microwave by a two phase state modulation providing better immunity from noise. However, this solution is difficult to implement as the passive end should be very simple, thus excluding the possibility of using known phase modulators whose design is too complex.

OBJECT OF THE INVENTION

The object of this invention is to obviate the preceding disadvantages, particularly to provide a radio data transmission system with a passive end in which a two phase state modulation is implemented for the transmission direction from the passive end to the central station. The passive end or terminal station of a radio system embodying the invention remains extremely simple and compact.

SUMMARY OF THE INVENTION

Accordingly, a radio system embodying the invention alternatively transmits by microwaves first and second data signals between first and second data processing units connected to the radio system. The first data signal is issued by the first unit so as to be transmitted to the second unit during first data transmission periods from the first unit towards the second unit. The second data signal is issued by the second unit so as to be transmitted to the first unit during second data transmission periods from the second unit towards the first unit. The system comprises a central station and a terminal station respectively connected to said first and second units. The stations exchange microwaves modulated by the first and second data signals. The terminal station comprises a square two-dimensional antenna and a microwave switcher The square two-dimensional antenna receives and issues via first ports first and second microwaves transmitted by the central station according to a first linear polarization during first and second data transmission periods respectively. The first microwave is modulated by the first data signal and the second microwave is not modulated.

The microwave switcher has an input connected to the first ports of the antenna and two outputs respectively connected to two second ports of the antenna and is switch-controlled by the second data signal to produce a third microwave from the second microwave applied to an input of the switcher. The third microwave is modulated in two phase states by the second data signal and is emitted by the antenna towards the central station during second data transmission periods according to a second linear polarization which is crossed relative to said first linear polarization.

According to another embodiment of the invention which ensures higher performance detection of the first data signal from the first microwave, the terminal station is equipped with quadratic detecting means. These quadratic detecting means comprise a field effect transistor with a first electrode connected to a reference ground of the terminal station, a second electrode connected to a reflective short circuit and a third electrode which receives the first microwave so as to produce at the second electrode a signal which is representative of the square of the first microwave at the second electrode, and to detect a d.c. component of said signal which is representative of the first data signal.

The central station preferably comprises a two-dimensional antenna with 2n square two-dimensional elements, whereby n is an integer equal to or greater than 1, and means for phase demodulation. The antenna has 2n first accesses respectively receiving 2n first phase-shifted microwave signals and 2n second phase-shifted microwave signals which correspond respectively to the first and second microwaves to emit the first and second microwaves to the terminal station during the first and second data transmission periods respectively, and to receive the third microwave during the second data transmission periods and to produce at 2n second accesses 2n phase-shifted microwave signals which are representative of the third microwave received.

Phase demodulation means are connected to the 2n square two-dimensional elements of the central station antenna and receives said 2n second and 2n third phase-shifted microwave signals to demodulate the second data signal during the second data transmission periods.

BRIEF DESCRIPTION OF THE DRAWING

The foregoing and other objects, features and advantages of the invention will be apparent from the following detailed description of several embodiments of the invention with reference to the corresponding accompanying drawings in which.

DESCRIPTION OF THE PREFERRED EMBODIMENTS

Figure 1:
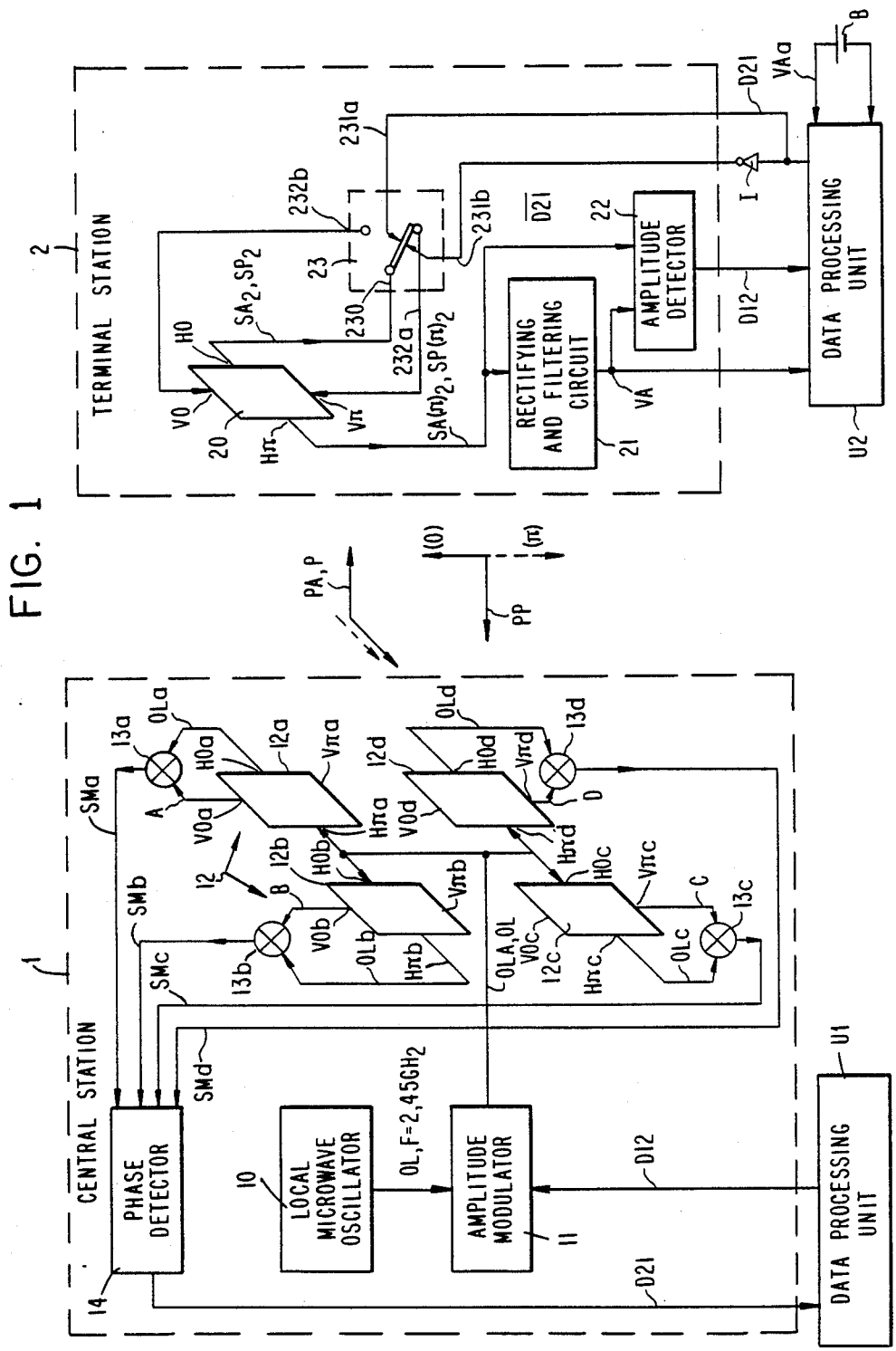
FIG. 1 is a block diagram of the radio system for data transmission with a passive end embodying the invention.

In reference to FIG. 1, the radio system for data transmission embodying the invention enables alternative transmission of series-type digital data signals D12 and D21 between two distant data processing units U1 and U2. The units U1 and U2 are respectively connected to a central station 1 and to a terminal station 2 of the system. Each of the central and terminal stations 1 and 2 includes radio equipment for data transmission associated with the units U1 and U2. The unit U1 and the central station 1 are e.g. included in a contact-free payment card operated phone kiosk. In this case, the unit U2 and the terminal station 2 are included in a contact-free payment card of the electronic chip card type.

The transmission of data signals D12 and D21 alternatively from the central station 1 towards the terminal station 2 and inversely, respectively requires an amplitude modulation and a modulation in two phase states 0 and $\pi$ which uses the same carrier microwave P of frequency F transmitted by the central station 1. Data transmission periods from the unit U1 towards the unit U2 and inversely are alternatively attributed to the data processing units U1 and U2. During the data transmission periods attributed to them, the units U1 and U2 respectively transmit the data signals D12 and D21. Reserved characters XON and XOFF carried by the data signals D12 and D21 are exchanged between the units U1 and U2 so as to indicate the beginning and end of a data transmission period to each other.

During the data transmission periods of unit U1 towards unit U2, the central station 1 transmits e.g. in horizontal linear polarization H, a microwave PA of frequency F which is modulated in amplitude by the data signal D12. During the data transmission periods of unit U2 towards unit U1, the central station 1 transmits in horizontal linear polarization H, the non-modulated microwave P. The microwave P is detected by an antenna of the terminal station 2 and is modulated in two phase states 0 and $\pi$ by the data signal D21 to produce a microwave modulated in phase PP of frequency F retransmitted towards the central station 1 in crossed linear polarization, i.e. in this case in vertical linear polarization V. The modulated microwaves PA and PP are respectively demodulated in the terminal station 2 and in the central station 1 so as to recover the data signals D12 and D21.

The central station 1 comprises a local microwave oscillator 10, an amplitude modulator 11, a microwave antenna 12, and means for synchronous phase demodulation comprised of four microwave mixers 13a to 13d and a phase detector 14.

The local oscillator 10 produces a microwave signal OL of frequency F e.g. equal to 2.45 GHz. The signal OL is applied at a first input of the amplitude modulator 11. A second input of the modulator 11 receives the data signal D12 transmitted by the unit U1.

During the data transmission periods from unit U1 towards unit U2, the signal D12 is active and the modulator 11 issues at output a modulated microwave signal OLA corresponding to the microwave signal OL whose amplitude has been modulated by the signal D12. The modulated microwave signal OLA is applied at horizontal polarization accesses of the antenna 12 which emits in response the corresponding horizontally polarized microwave PA.

During the data transmission periods from unit U2 towards unit U1, the signal D12 is inactive and the modulator 11 issues at output the microwave signal OL. The signal OL is applied to the horizontal polarization accesses of the antenna 12 which emits the corresponding microwave P in response.

The microwave antenna 12 is a two-dimensional antenna with 2n square-shaped printed patterns, whereby n is an integer equal to or greater than 1. In the embodiment shown in FIG. 1, n is selected equal to 2 and the antenna 12 comprises four patterns 12a to 12d. Also in reference to FIG. 2, the antenna 12 is supported by a two-sided printed circuit plate 123. On a front side, and besides the antenna patterns 12a to 12d, the plate 123 also supports the microwave mixers 13a to 13d. A conductive rear side of the plate 123 is connected to a reference ground and forms a reflective screen R1. Each pattern 12a to 12d is a square with sides of dimensions equal to $\lambda/2$, where $\lambda$ is the wavelength corresponding to the frequency F of the microwave signal OL. In order to constitute the two-dimensional microwave antenna 12, the four patterns 12a to 12d are respectively placed in the four corners of a square of area dxd so that the sides of the antenna patterns are parallel and perpendicular to the sides of the square of area dxd, whereby d is a characteristic dimension of the antenna 12 and determined in a well known manner so as to obtain a desired radiation pattern. An antenna pattern, e.g. 12a, comprises two vertical polarization ports VOa and V$\pi$a respectively situated at the centers of two first parallel sides of the antenna pattern 12a, and two horizontal polarization ports HOa and Hπa respectively situated at the centers of two second parallel sides of the antenna pattern 12a. A microwave signal applied at a vertical or horizontal polarization ports of a square antenna pattern produces the transmission of a corresponding microwave respectively polarized vertically or horizontally, and reciprocally a vertically or horizontally polarized microwave received by the antenna pattern produces a microwave signal corresponding respectively to the two vertically or horizontally polarized ports of the antenna pattern. Two microwave signals respectively detected at the two vertically or horizontally polarized ports of a square antenna pattern and corresponding to a same received microwave are phase shifted by $\pi$ and reciprocally a same microwave signal applied successively at two vertically or horizontally polarized ports produces two correspondingly polarized microwaves which are phase shifted by $\pi$ from each other.

Figure 2:
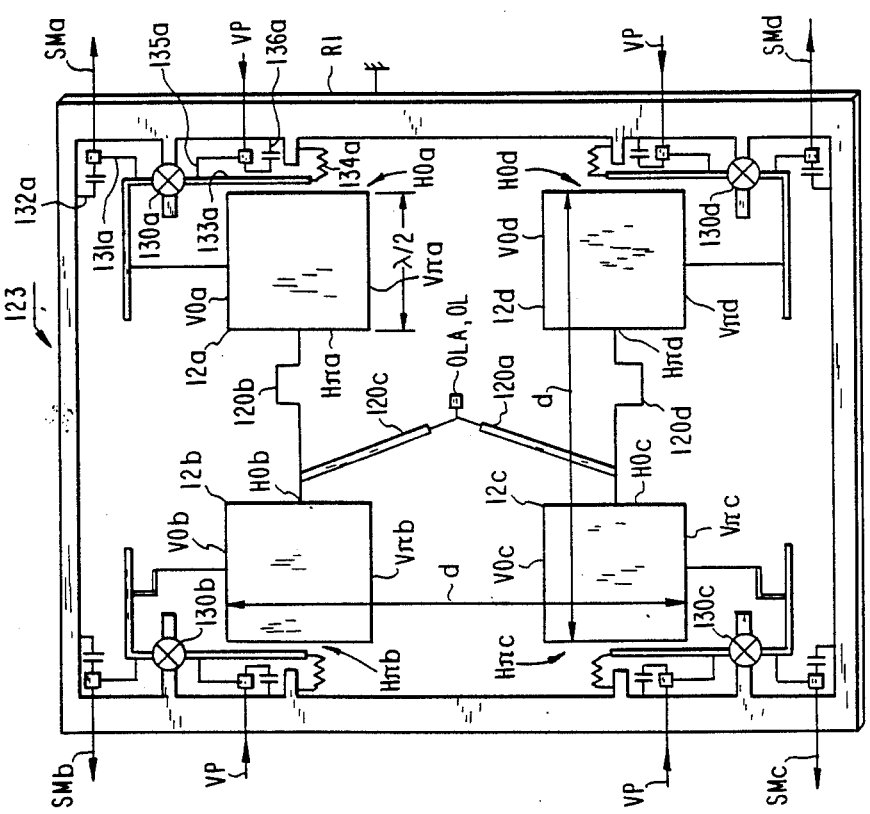
FIG. 2 shows an embodiment in microstrip technology of an antenna and microwave mixers included in a central station of the radio system embodying the invention.

As shown in FIG. 2, the microwave signals OLA and OL are supplied at horizontally polarized ports Hπa, HOb, HOc and Hπd of the antenna 12 via adapting and phase shifting microstrips 120b, 120c, 120d and 120a. The microwave signals received at accesses Hπa and Hπd and corresponding to the signal OLA or OL, are phase shifted by $\pi$ from the corresponding microwave signals received at ports HOb and HOc and the antenna 12 emits the corresponding horizontally polarized microwave PA or P towards the terminal station 2.

In reference to FIG. 1, the terminal station 2 comprises an antenna 20, a rectifying and filtering circuit 21, an amplitude detector 22, and a microwave switcher 23.

The antenna 20 is comprised of a single square printed pattern that is identical to the printed patterns 12a to 12d of the central station 1.

During the data transmission periods from unit U1 towards unit U2, the antenna 20 receives the microwave PA whose amplitude is modulated by the signal D12 and issues corresponding microwave signals in response which are phase shifted by $\pi$ from each other $SA_2$ and $SA(\pi)_2$ respectively by horizontally polarized accesses HO and Hπ. The signals $SA_2$ and $SA(\pi)_2$ are respectively applied to an input 230 of the switcher 23 and to inputs of circuit 21 and detector 22. During the data transmission periods from unit U2 towards unit U1, the antenna 20 receives the microwave P and issues in response corresponding microwave signals phase shifted by $\pi$ from each other $SP_2$ and $SP(\pi)_2$ respectively via ports HO and Hπ. Like signals $SA_2$ and $SA(\pi)_2$, the signals $SP_2$ and $SP(\pi)_2$ are respectively applied to an input 230 of the switcher 23 and to inputs of circuits 21 and detector 22.

The rectifying and filtering circuit 21 is a conventional circuit e.g. including a rectifier diode and a capacitance. The circuit 21 produces a d.c. supply voltage VA by rectifying and filtering. The voltage VA is supplied to unit U2 to supply all or some of the circuits in unit 2, and, if necessary, to the amplitude detector 22. A miniature electric battery B is, if necessary, provided to supply unit U2 with an additional d.c. supply voltage VAa.

During the data transmission periods from unit U1 towards unit U2, the detector 22 recovers the data signal D12 by direct detection of the amplitude of the signal. The data signal D12 issued by the detector 22 is provided to the data processing unit U2.

According to a first preferred embodiment of a low-range transmission system embodying the invention, the detector 22 of the terminal station 2 is realized in the conventional manner by means of a detection diode operating in a non-linear state.

According to a more efficient second preferred embodiment of the transmission system embodying the invention, the detector 22 is realized by means of a field effect transistor (FET) operating as a multiplying device for quadratic detection of the data signal D12. In this case, the power supply voltage VA is provided to the detector 22 so as to polarize a gate of the field effect transistor.

Figure 3:
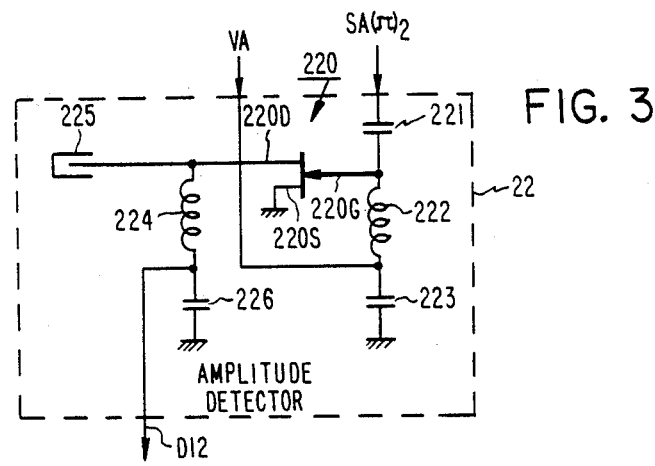
FIGS. 3 and 4 respectively show the skeleton diagram and an embodiment in microstrip technology of a quadratic amplitude detector included in a terminal station of the radio system embodying the invention.

In reference to FIG. 3, a detector 22 for said second embodiment of the transmission system embodying the invention comprises essentially a transistor FET, 220.

The microwave signal $SA(\pi)_2$ is provided via a coupling capacitor 221 to a gate 220G of the transistor 220 and to a first connecting terminal of a coil 222. A second terminal of the coil 222 receives the power supply voltage VA and is connected to a reference ground of the terminal station 2 via a capacitor 223. The voltage VA is in this case a negatively polarized voltage so as to polarize the gate 220G of the transistor 220 adequately. A source 220S of the transistor 220 is connected to the ground. A drain 220D of the transistor 220 is connected to the first terminal of a coil 224, and to a reflective short circuit 225. A second terminal of the coil 224 is connected to a ground via a capacitor 226. During the data transmission periods from unit U1 towards unit U2, the signal $SA(\pi)_2$ applied to the gate 220G also appears on the drain 220D of the transistor 220 and propagates towards the short circuit 225. The signal $SA(\pi)_2$ is reflected by the short circuit 225 and returns towards the drain 220D. The transistor 220 operates as a multiplier and produces the signal $(SA(\pi))^2$. The signal $(SA(\pi)_2)^2$ has a d.c. component which is proportional to the amplitude of the signal $(SA(\pi)_2)^2$ and is representative of the data signal D12. This d.c. component which is representative of the signal D12 is detected at the second terminal of the coil 224 and is supplied to the data processing unit U2.

Figure 4:
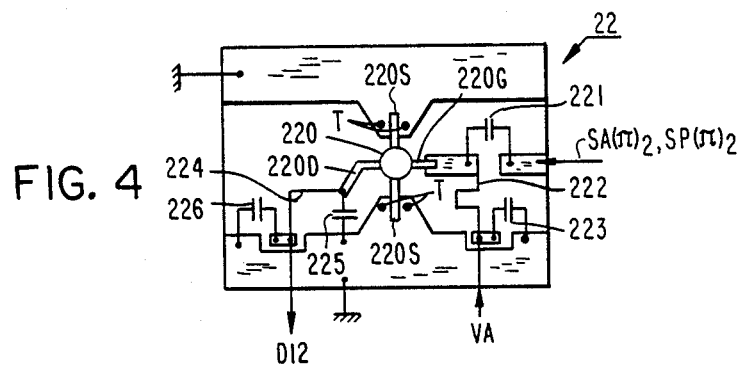

A corresponding practical embodiment in microstrip technology of the amplitude detector 22 described in reference to FIG. 3 is shown as an example in FIG. 4. In practice, the coils 222 and 224 are embodied by microstrips of adequate length bearing the same reference numerals 222 and 224. The reflective short circuit 225 is embodied by means of a capacitor with a first terminal connected to the drain 220D of the transistor 220 via a microstrip of adequate length, and with a second terminal connected to the ground. Metallized holes T are provided on both sides of the lugs of the source 220S of the transistor 220.

In reference to FIG. 1, during the data transmission periods from unit U2 towards unit U1, the unit U2 issues the data signal D21 to be transmitted to the unit U1 via the stations 2 and 1. The signal D21 is applied at a first control input 231a of the switcher 23 and to an input of a logic inverter I. The inverter I produces a data signal D21 which is complementary to the signal D21. The signal D21 is applied at a second control input 231b of the switcher 23.

Figure 5:
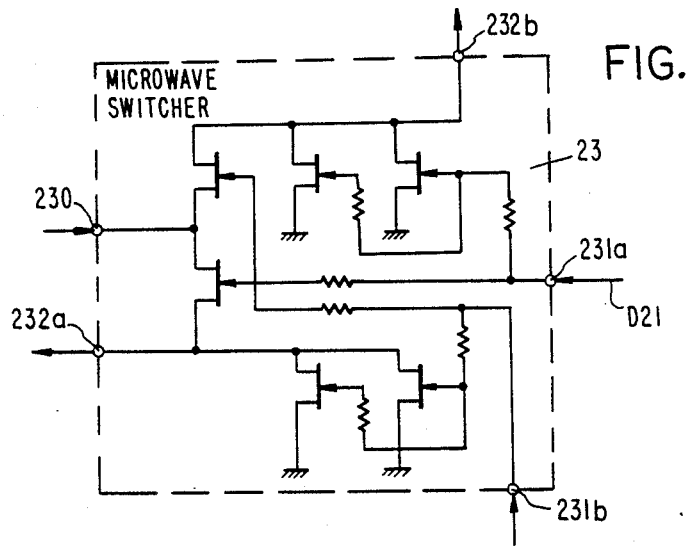
FIG. 5 is a skeleton diagram of a microwave switcher included in the terminal station.

A circuit diagram of the microwave switcher 23 is shown in FIG. 5. The switcher 23 is preferably an integrated switcher such as e.g. a wide band microwave switcher marketed by the TACHONICS CORPORATION company under reference TCSW-0401. First and second outputs 232a and 232b of the switcher 23 are respectively connected to first and second vertically polarized accesses Vπ and VO of the antenna 20. When the data signal D21 is in the logic state "0", the input 230 is connected to the output 232b of the switcher 23 and the microwave signal SP₂ supplied by the port HO of the antenna 20 is applied to the port VO of the antenna 20 which, in response, emits the corresponding microwave PP with a relative phase equal to 0. When the data signal D21 is in the logic state "1", the input 230 is connected to the output 232a of the switcher 23 and the microwave signal SP₂ is applied to the port Vπ of the antenna 20 which, in response, emits the corresponding microwave PP with a relative phase equal to π. The carrier microwave P is thus modulated in two phase states 0 and π by the signal D21.

Figure 6:
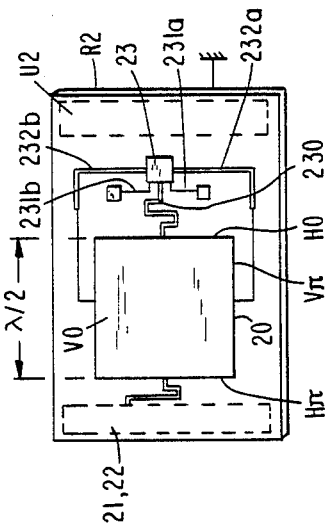
FIG. 6 shows an embodiment in microstrip technology of a contact-free chip card equipped with a terminal station of a radio system embodying the invention.

In reference to FIG. 6, the terminal station 2 and the data processing unit U2 are included in a chip card 202 represented on a scale of 3/4. A front side of the card 202 supports the antenna 20 and the various circuits of the station 2 and the unit U2. The circuits of the station 2 and of the unit U2 are in the form of chips having lugs are soldered to microstrips of the plate 202. The locations on the card 202 of the circuits 21 and 2 of the station 22 and of the unit U2 are shown in broken lines. A reflective screen R2 located on a rear side of the card 202 is connected to a reference ground of the terminal station 2. In order to be integrated into the chip-card 202, the amplitude detector 22 shown in FIGS. 1, 3 and 4 is constructed in a more compact form than that shown as an example in FIG. 4.

In reference to FIG. 1, the microwave PP transmitted by the antenna 20 of the terminal station 2 is received in the central station 1 by the 2n=4. patterns 12a to 12d of the antenna 12. The 2n=4 patterns 12a, 12b, 12c and 12d issue in response, on reception of the microwave PP, corresponding microwave signals A, B, C and D respectively via the vertically polarized ports VOa, VOb, Vπc and Vπd of the antenna 12. The signals A to D are respectively applied to first inputs of the microwave mixers 13a to 13d. The signals A to D are phase shifted in twos by $\pm\pi/2$ or $\pm\pi$ modulo $2\pi$. Second inputs of the mixers 13a to 13d respectively receive local oscillator signals OLa to OLd. The local oscillator signals OLa, OLb, OLc and OLd are respectively issued by the horizontally polarized ports HOa, Hπb, Hπc and HOd of the antenna 12 and are derived from the signal OL which is supplied to the antenna patterns 12a to 12d by the local oscillator 10 via the amplitude modulator 11. The signals OLa to OLd are phase shifted in twos by 0 or $\pm\pi$ modulo $2\pi$. The signals A to D and OLa to OLd are expressed by the equalities :

$A = U \cos(\omega t + \Psi + \theta)$,
$B = U \cos(\omega t + \Psi + \theta + 3\pi/2)$,
$C = U \cos(\omega t + \Psi + \theta + \pi)$, and
$D = U \cos(\omega t + \Psi + \theta + \pi/2)$, and
$OLa = V \cos(\omega t)$,
$OLb = V \cos(\omega t + \pi)$,
$OLc = V \cos(\omega t)$, and
$OLd = V \cos(\omega t + \pi)$, whereby U and V are respectively amplitudes of the microwave signals A to D and local oscillator signals OLa to OLd, and whereby $\omega$ and $\Psi$ respectively represent (i) the angular frequency corresponding to the frequency F of the signal OL and (ii) a random phase shift introduced by the radio transmission between the stations 1 and 2, and whereby $\theta = 0$ or $\pi$ to represent the phase state function of data signal D21 of the microwave PP modulated in two phase states 0 and π.

The mixers 13a to 13d respectively issue at output four low-frequency demodulation signals SMa to SMd derived from products of signals A.OLa, B.OLb, C.OLc and D.OLd produced by the mixers 13a to 13d. The signals SMa to SMd are supplied to the phase detector 14 for the detector 14 to recover the data signal D21 from the signals SMa to SMd. The signals SMa to SMd are expressed by the following equalities:

$SMa = U.V \cos(\Psi + \theta)$
$SMb = U.V \cos(\Psi + \theta + \pi/2)$
$SMc = U.V \cos(\Psi + \theta + \pi)$
$SMd = U.V \cos(\Psi + \theta + 3\pi/2)$.

The equalities above show that the signals SMa to SMd depend, according to the trigonometrical functions sine or cosine of the phase state $\theta = 0$ or $\pi$, on the microwave PP and the random phase shifting $\Psi$.

Figure 7:
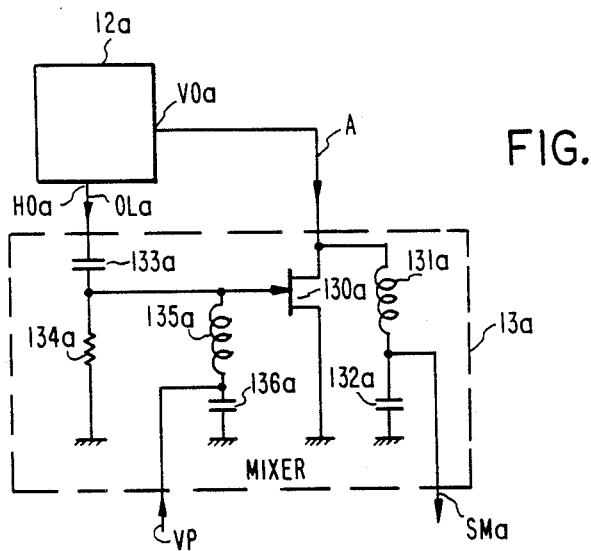
FIG. 7 is a skeleton diagram of a microwave mixer included in the central station.

The microwave mixers 13a to 13d have similar structures and operate in a similar manner. The mixer 13a is shown in detail in FIG. 7; it essentially comprises a field effect transistor 130a operating in a non-linear state. A drain of the transistor 130a is connected to a first terminal of a coil 131a. A second terminal of the coil 131a is connected to the ground via a capacitor 132a. A source of the transistor 130a is connected to the reference ground of the central station 1. A gate of the transistor 130a is connected to the access HOa of the antenna pattern 12a via a coupling capacitor 133a and to first terminals of a resistor 134a and to a coil 135a. A second terminal of the resistor 134a is connected to the ground. A second terminal of the coil 135a is connected to the ground via a capacitor 136a.

The signals A and OLa are respectively applied to the drain and the gate of the transistor 130a. The gate of the transistor 130a is polarized by a negative bias voltage VP applied to a second terminal of the coil 135a. The signal SMa is produced at second terminal level of the coil 131a.

The practical embodiment in microstrip technology of the mixer 13a and mixers 13b to 13c is shown in FIG. 2. The microstrips 131a and 135a make up coils of the same reference numerals 131a and 135a. The microstrip 133a capacitively couples the gate of the transistor 130a to the port HOa of the antenna pattern 12a and makes up the liaison capacitor of the same reference numeral 133a.

Figure 8:
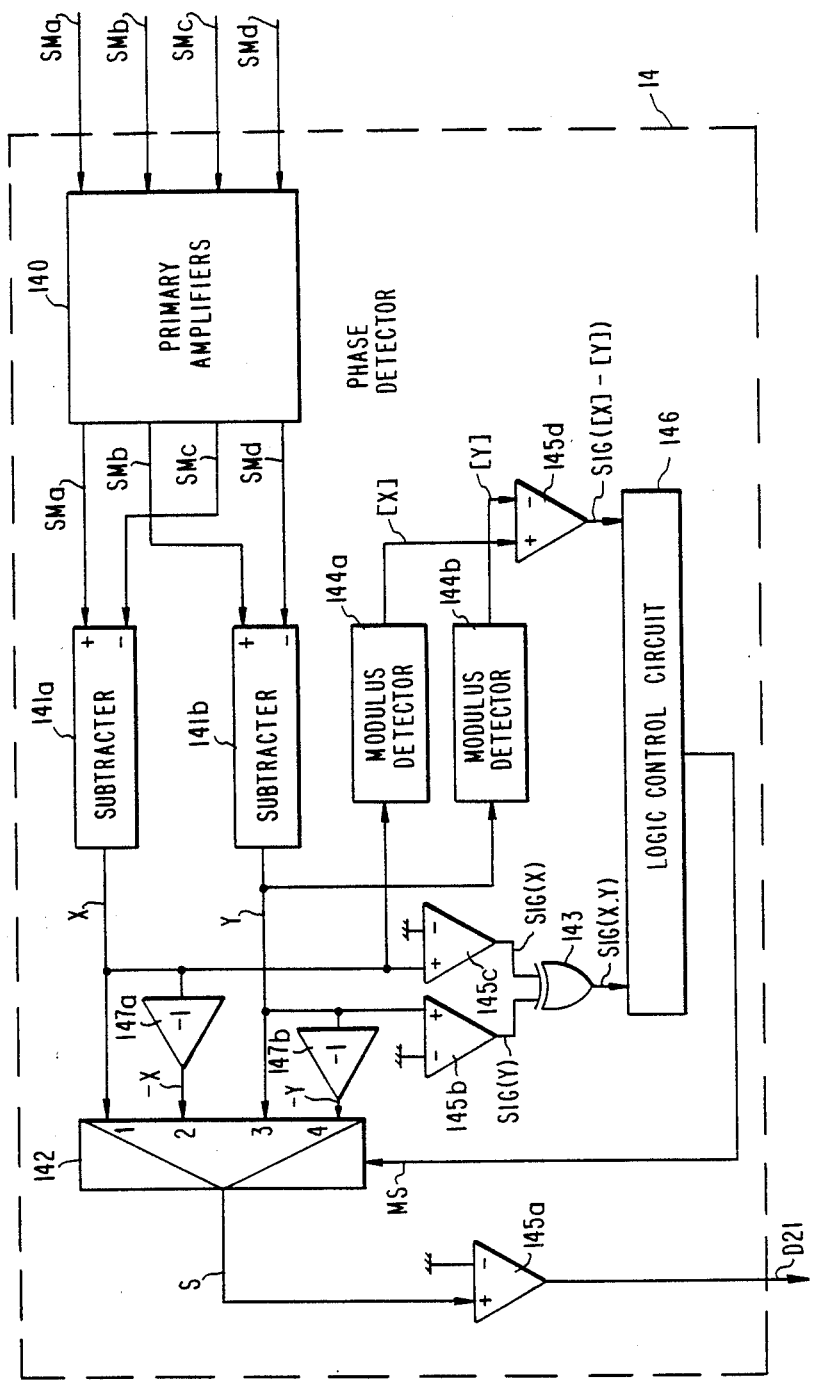
FIG. 8 is a block diagram of a phase detector included in the central station.

In reference to FIG. 8, the phase detector 14 essentially comprises primary amplifiers 140, two analog subtracters 141a and 141b, a four-input analog multiplexer 142, a two-input XOR (exclusive or) gate 143, two modulus detectors 144a and 144b, four comparators 145a to 145d and a logic control circuit 146.

The signals SMa and SMb are respectively applied via the primary amplifiers 140 to minuend inputs + of the subtracters 141a and 141b. The signals SMc and SMd are respectively applied via the primary amplifiers 140 to subtrahend inputs - of the subtracters 141a and 141b. The subtracters 141a and 141b issue at output signals X and Y that are respectively representative of the difference resulting from SMa-SMc and SMb-SMd and expressed by the following equalities :

$X = SMa - SMc = U.V.[\cos(\Psi + \theta) - \cos(\Psi + \theta + \pi)] = -2.U.V \cos(\Psi + \theta)$, and
$Y = SMb - SMd = U.V.[\cos(\Psi + \theta + \pi/2) - \cos(\Psi + \theta + 3\pi/2)] = 2.U.V.\sin(\Psi + \theta)$.

The signals X and Y are respectively supplied to first and third inputs of the multiplexer 143. The signals $-X$ and $-Y$ which are representative of the differences resulting from SMc-SMa and SMd-SMb are produced from the signals X and Y by the inverter amplifiers 147a and 147b and are respectively supplied at second and fourth inputs of the multiplexer 142. A signal S is selected from among the signals X, −X, Y and −Y by a selection word MS which is supplied by the logic control circuit 146 and applied at selection inputs of the multiplexer 142. The selected signal S is supplied at a minuend input + of the comparator 145a having a subtrahend input connected to the reference ground. The comparator 145a constitutes a sign detector which issues a logic state "0" when the sign of the signal S is positive and a logic state "1" in the opposite case. The comparator 145a issues the data signal D21 at output.

The purpose of the comparators 145b, 145c and the XOR gate 143 is to produce a signal SIG(X.Y) which is representative of the sign, i.e., polarity of the product of the signals X.Y.

Minuend inputs + of the comparators 145b and 145c respectively receive the signals Y and X. Subtrahend inputs - of the comparators 145b and 145c are connected to the reference ground. The comparator 145b issues a signal SIG(Y) which is representative of the sign of signal Y. The comparator 145c issues a signal SIG(X) which is representative of the sign of signal X. The signal SIG(X) or SIG(Y) is in a logic state "0" when the sign of the corresponding signal X or Y is positive, and in a logic state "1" in the opposite case.

The signals SIG(X) and SIG(Y) are respectively applied to first and second inputs of the gate 143, and the gate 143 issues at output a signal SIG(X.Y) which is representative of the sign of the product of the signals X.Y. The signal SIG(X.Y) is in a logic state "0" when the sign of the product X.Y is positive, and in a logic state "1" in the opposite case, i.e. when the product X.Y is negative. The signal SIG(X.Y) is applied to a first input of the logic control circuit 146.

The modulus detectors 144a and 144b respectively receive at input the signals X and Y and issue at output the moduli [X] and [Y] of these signals. The detectors 144a and 144b are e.g. made up of precision double alternation rectifying circuits. The moduli [X] and [Y] are respectively supplied at minuend + and subtrahend − inputs of the comparator 145d. The comparator 145d issues at output a signal SIG([X]−[Y]) which is representative of the sign of the modulus difference resulting from [X]−[Y]. The SIG([X]−[Y]) is applied at a second input of the logic control circuit 146.

The logic control circuit 146 carries out a dynamic selection of the signal S from among the signals X, −X, Y and −Y so as to enable correct and optimal recovery of the data signal D21. This dynamic selection is carried out independently of the random phase shift variations caused by the radio transmission and likely to introduce decision errors on the data signal D21. From the signals SIG([X]−[Y]) and SIG(X.Y), the circuit 146 detects which of the signals X and Y has a superior modulus as well as the sign changes of the signals X and Y caused by the random phase shift variations. The modulus of the detected signal [S] is taken equal to the greater of the moduli [X] and [Y]. The sign attributed to the selected signal S depends on the detected sign changes of the signals X and Y and from the signal SIG(X.Y).

Figure 9:
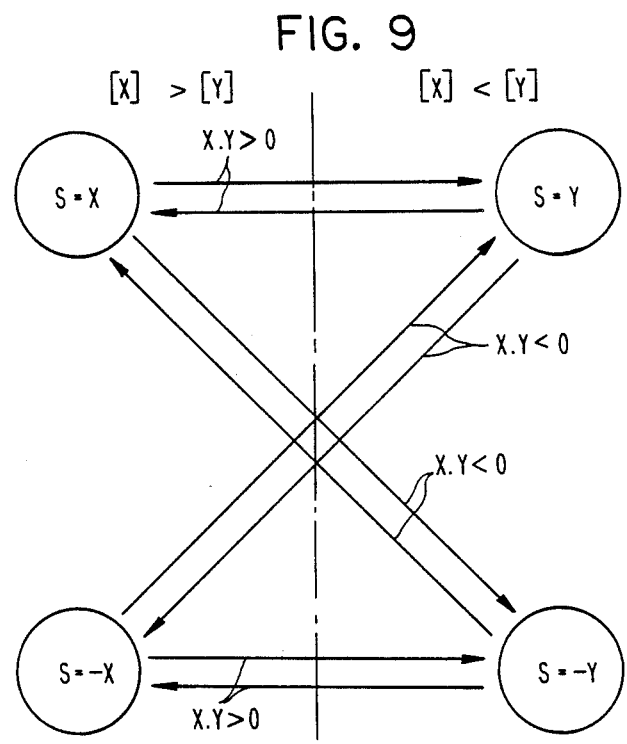
FIG. 9 shows a logic diagram relating to the operating of a logic control circuit included in the phase detector of FIG. 8 so as to recover a data signal transmitted by the terminal station from a dynamic selection of a demodulation signal from among the four available demodulation signals.

The diagram shown in FIG. 9 specifies the selected signal S=X, S=−X S=Y or S=−Y according to the modulus conditions [X]>[Y] and [X]<[Y] and to the sign conditions X.Y>0 and X.Y<0 detected from the signals SIG([X]−[Y]) and SIG(X.Y) respectively.

In order to show how this diagram should be interpreted, an initial state during transmission is presupposed as an example whereby [X]>[Y] is the detected modulus condition; the signal S=X or S=−X is then selected. In the event of the condition [X]<[Y] then being detected, if the signal S=X is the signal selected in the initial state, then the new condition [X]<[Y] entails the selection of the signal S=Y in the event of the sign condition X.Y>0 also being detected, and entails the selection of the signal S=−Y if the condition X.Y<0 is detected. If the signal S=−X is the signal selected in the initial state, then the new condition [X]<[Y] entails the selection of the signal S=−Y in the event of the sign condition X.Y>0 also being detected, and entails the selection of the signal S=Y if the condition X.Y<0 is detected. Those skilled in the art will easily interpret this diagram for an initial state during transmission in which [X]<[Y] is the module condition detected.

What we claim is:

1. A radio system for alternatively transmitting by microwaves first and second data signals (D12, D21) between first and second data processing units (U1, U2) connected to said radio system, said first data signal (D12) being transmitted from said first unit (U1) to said second unit (U2) during first data transmission periods, and said second data signal (D21) being transmitted from said second unit (U2) to said first unit (U1) during said second data transmission periods, said system comprising data signal transmitting and receiving central and terminal stations (1, 2), said transmitting and receiving central station (1) being connected to said first unit (U1) for emitting a first microwave (PA) modulated by said first data signal (D12) during said first transmission periods and a second unmodulated microwave (P) during said second transmission periods to said terminal station, said first and second emitted microwaves (PA, P) having a first linear polarization, said transmitting and receiving terminal station (D) being connected to said second unit (U2) and comprising:

an antenna (20) having two first ports (HO, Hπ) arranged to transduce said first linear polarization and two second ports (Vπ, VO) arranged to transduce a second linear polarization, the second linear polarization being relative to said first linear polarization, means (21, 22) connected to one (Hπ) of said first antenna ports for detecting said first data signal (D12) in the first modulated microwave (PA) thereby applying a replica of said first data signal to said second unit (U2), and a microwave switcher (23) having an input (230) connected to the other (HO) of said first antenna ports and two outputs (232a, 232b) respectively connected to said second antenna ports (Vπ, VO), said second data signal (D21) controlling said microwave switcher so said switcher derives in response to said second microwave (P) received via said switcher input (230), a third microwave (PP) modulated in two phase states by said second data signal (D21) and transmitted according to said second polarization by said antenna (20) towards said central station (1) during said second data transmission periods.

2. The radio system as claimed in claim 1, wherein said first microwave is modulated in amplitude by said first data signal, and wherein said detecting means comprises quadratic detection means for detecting said first received data signal from said first microwave.

3. The radio system as claimed in claim 2, wherein said quadratic detecting means comprises a field effect transistor with a first electrode connected to a reference ground of said terminal station, a second electrode connected to a reflective short circuit and a third electrode which receives said first microwave for deriving a signal which is representative of the square of said first microwave at said second electrode, and for detecting a d.c. component of said signal which is representative of said first data signal.

4. The radio system as claimed in claim 1, wherein said terminal station comprises means connected to one of said first ports of the antenna for producing a d.c. supply voltage by rectifying and filtering of said first and second received microwaves, said d.c. supply voltage being provided to circuits in said terminal station and to a second data processing unit.

5. The radio system as claimed in claim 1, wherein said central station comprises
   a two-dimensional antenna with 2n square two-dimensional elements, wherein n is an integer greater than 1, with 2n first ports respectively receiving 2n first phase-shifted microwave signals and 2n second phase-shifted microwave signals which correspond respectively to said first and second microwaves for emitting said first and second microwaves to said terminal station during said first and second data transmission periods respectively, and for receiving said third microwave during the second data transmission periods and for deriving at 2n second ports 2n phase-shifted microwave signals which are representative of the third microwave received, and
   means connected to said 2n square two-dimensional elements of said central station antenna and receiving said 2n second and 2n third phase-shifted microwave signals for phase demodulating said second data signal during the second data transmission periods.

6. The radio system as claimed in claim 5, wherein said phase demodulating means comprises
   2n microwave mixers respectively connected to first and second ports of 2n square two-dimensional antenna elements so as to each receive corresponding second and third microwave signals and for respectively deriving 2n low-frequency demodulated signals which depend, according to trigonometrical functions of said phase state function of said second data signal on said third microwave and a random phase shift introduced by said radio transmission, and
   means for recovering said second data signal in response to the difference between two of said 2n demodulation signals.

7. The radio system as claimed in claim 6, wherein said recovering means comprises
   means for calculating 2n signal differences that only depend on trigonometrical functions of the phase state function of said second data signal of said third microwave, and
   logic means for dynamically selecting one of said 2n signal differences according to the moduli and polarities of said differences so as to recover a replica of said second data signal.

8. The radio system as claimed in claim 1, wherein said terminal station and said second data processing unit are integrated in a contact-free payment card including an electronic chip.

9. The radio system of claim 1 wherein the antenna has a square two dimensional configuration.

10. A transmitting and receiving terminal station for a radio system wherein microwaves alternatively transmit first and second data signals (D12, D21) between first and second data processing units (U1, U2) connected to said radio system, said first data signal (D12) being transmitted from said first unit (U1) to said second unit (U2) during first data transmission periods, and said second data signal (D21) being transmitted from said second unit (U2) to said first unit (U1) during second data transmission periods, a transmitting and receiving central station (1) being connected to said first unit (U1) emitting a first microwave (PA) modulated by said first data signal (D12) during said first transmission periods and a second unmodulated microwave (P) during said second transmission periods to said terminal station, said first and second emitted microwaves (PA, P) having a first linear polarization,
    said transmitting and receiving terminal station (2) being connected to said second unit (U2) and comprising:
    an antenna (20) having two first ports (HO, H$\pi$) arranged to transduce said first linear polarization and two second ports (V$\pi$, VO) arranged to transduce a second linear polarization, the second linear polarization being crossed relative to said first linear polarization,
    means (21, 22) connected to one (H$\pi$) of said first antenna ports for detecting said first data signal (D12) in the first modulated microwave (PA) thereby applying a replica of said first data signal to said second unit (U2), and
    a microwave switcher (23) having an input (230) connected to the other (HO) of said first antenna ports and two outputs (232a, 232b) respectively connected to said second antenna ports (V$\pi$, VO), said second data signal (D21) controlling said microwave switcher so said switcher derives in response to said second microwave (P) received via said switcher input (230), a third microwave (PP) modulated in two phase states by said second data signal (D21) and transmitted according to said second polarization by said antenna (20) towards said central station (1) during said second data transmission periods.

11. The terminal station of claim 10 wherein the antenna has a square two dimensional configuration.

* * * * *